US010627052B2

(12) United States Patent
Cook

(10) Patent No.: US 10,627,052 B2
(45) Date of Patent: Apr. 21, 2020

(54) PRESSURE VESSEL TRANSPORT SYSTEM

(71) Applicant: Steady Fill Co., LLC, Duncan, OK (US)

(72) Inventor: Gregory D. Cook, Duncan, OK (US)

(73) Assignee: Steady Fill Co., LLC, Duncan, OK (US)

( * ) Notice: Subject to any disclaimer, the term of this patent is extended or adjusted under 35 U.S.C. 154(b) by 137 days.

(21) Appl. No.: 15/693,749

(22) Filed: Sep. 1, 2017

(65) Prior Publication Data

US 2019/0072235 A1 Mar. 7, 2019

(51) Int. Cl.

| | |
|---|---|
| ***B65G 7/12*** | (2006.01) |
| ***B65G 7/00*** | (2006.01) |
| ***F17C 13/08*** | (2006.01) |
| ***A45F 5/00*** | (2006.01) |
| ***F17C 1/00*** | (2006.01) |
| *A45F 5/10* | (2006.01) |
| *B65D 3/04* | (2006.01) |
| *B65D 5/02* | (2006.01) |

(52) U.S. Cl.

CPC ................ *F17C 13/08* (2013.01); *F17C 1/00* (2013.01); *F17C 13/084* (2013.01); *A45F 5/10* (2013.01); *B65D 3/04* (2013.01); *B65D 5/0209* (2013.01); *F17C 2201/0109* (2013.01); *F17C 2201/058* (2013.01); *F17C 2205/0111* (2013.01); *F17C 2205/0165* (2013.01); *F17C 2205/0323* (2013.01); *F17C 2260/015* (2013.01); *F17C 2270/01* (2013.01); *F17C 2270/0745* (2013.01)

(58) Field of Classification Search

CPC .... F17C 2205/0165; F17C 13/08; F17C 1/00; F17C 2201/0109; F17C 2205/0115; F17C 2205/0308; F17C 13/084; F17C 2201/058; A45F 5/10; A45F 5/1046; A45F 2005/1006; A45F 2005/1013; A45F 2005/1053; A45F 2005/1073; B65G 7/12; B65D 85/36; B65D 3/04; B65D 5/0209; B65D 5/46056; B65D 5/46096; Y10S 220/921

USPC ....... 220/772, 773, 775, 776, 758, 754, 752, 220/581, 724, 728; 137/382; 150/154, 150/901; 206/407, 0.6, 525, 446; D9/430

See application file for complete search history.

(56) References Cited

U.S. PATENT DOCUMENTS 319,399 A * 6/1885 France .................... B42D 3/18 294/138
1,971,322 A * 8/1934 Miller ...................... A45F 5/10 294/152
2,465,095 A * 3/1949 Harvey .................. F17C 13/06 220/327
2,838,085 A * 6/1958 Beeler ................... A62B 25/00 190/115
3,084,824 A * 4/1963 Kuzma ................... B65D 9/20 206/446

(Continued)

*Primary Examiner* — Gideon R Weinerth
(74) *Attorney, Agent, or Firm* — Hall Estill Attorneys at Law; Tyler J. Mantooth

(57) ABSTRACT

A pressure vessel transport system can have one or more handles that allow a pressure vessel to be efficiently and safely transported. The transport system can consist of a housing surrounding a pressure vessel with the pressure vessel having a valve. The housing may continuously extend along a longitudinal axis of the pressure vessel to position the valve within the housing.

20 Claims, 4 Drawing Sheets

(56) References Cited

U.S. PATENT DOCUMENTS 3,333,685 A * 8/1967 Pezdek .................... B65D 5/14 206/728
3,921,872 A * 11/1975 Buell, Jr. .................. A45F 5/00 206/446
4,022,343 A * 5/1977 Richardson ............ B65D 59/06 206/521
4,103,806 A * 8/1978 White .................... B65D 83/40 220/724
4,209,116 A * 6/1980 Hendricks ................. A45F 5/10 220/771
4,383,637 A * 5/1983 Pfieffer ................ B65D 5/0227 229/110
4,624,495 A * 11/1986 Marsh ...................... B65G 7/04 294/165
4,754,996 A * 7/1988 Tecca ...................... B63C 11/22 294/151
4,796,936 A * 1/1989 Sherin ....................... A45F 5/10 294/148
4,802,344 A * 2/1989 Livingston ................ A45F 3/16 62/372
4,804,218 A * 2/1989 Hilliard ................... B63C 11/22 294/157
4,890,873 A * 1/1990 Prada ........................ A45F 5/10 294/138
4,905,855 A * 3/1990 Troiano ................ F17C 13/084 206/0.6
4,967,923 A * 11/1990 Wren ...................... F17C 13/06 137/382
5,253,760 A * 10/1993 Miller .................... A62B 25/00 206/525
5,511,846 A * 4/1996 Fuller ...................... A45C 3/00 294/149
5,556,146 A * 9/1996 Kirk ......................... B65G 7/12 294/31.2
5,564,568 A * 10/1996 Rankin, Sr. ........ B65D 81/3886 206/446
5,829,629 A * 11/1998 Usher .................. B65D 81/107 220/724
5,845,809 A * 12/1998 Garrett .................... F16K 35/10 220/728
6,012,411 A 1/2000 Hochbrueckner
6,123,187 A * 9/2000 Bartels .................. F17C 13/001 206/0.6
6,247,491 B1 * 6/2001 Petryna ................... F16K 35/10 137/382
D502,646 S * 3/2005 Postulka ........................ D9/430
7,117,908 B1 * 10/2006 Coron ....................... F17C 3/00 150/154
D536,526 S * 2/2007 Leighton ........................ D3/316
7,195,031 B2 3/2007 Trettin et al.
7,316,435 B2 1/2008 Leighton
7,373,947 B2 5/2008 Trettin et al.
7,415,988 B2 8/2008 Trettin et al.
7,520,549 B2 4/2009 Leighton
7,699,188 B2 4/2010 Oliviera et al.
7,753,589 B2 7/2010 Palt
D763,405 S 8/2016 Bussard et al.
9,598,228 B2 * 3/2017 Magdovitz ............. B65D 85/36
9,751,451 B1 * 9/2017 Tillman .................. B66C 1/122
2004/0020793 A1 * 2/2004 Peterolff ............ B65D 77/0406 206/0.6
2005/0211589 A1 * 9/2005 Holzhaus, II ........ A47G 33/045 206/423
2005/0275233 A1 * 12/2005 Leighton ................ A45C 11/00 294/152
2007/0267302 A1 11/2007 McGhie
2008/0110784 A1 * 5/2008 Nowicki ............... F17C 13/084 206/446
2010/0032328 A1 * 2/2010 Gillain ................. B65D 85/305 206/427
2015/0320191 A1 * 11/2015 Stevens ..................... A45F 5/10 294/149
2015/0360805 A1 * 12/2015 Magdovitz ............. B65D 85/36 229/107
2019/0072235 A1 * 3/2019 Cook ...................... F17C 13/08

* cited by examiner

PRESSURE VESSEL TRANSPORT SYSTEM

SUMMARY

A pressure vessel transport system, in accordance with various embodiments, consists of a housing surrounding a pressure vessel with the pressure vessel having a valve. The housing may continuously extend along a longitudinal axis of the pressure vessel to position the valve within the housing.

DETAILED DESCRIPTION

Embodiments of the present disclosure are generally directed to a system for safely and efficiently transporting a pressurized vessel. It is noted that a pressure vessel is hereby meant as any sealed contained with an internal chamber having a pressure above ambient atmospheric pressure. As such, a pressure vessel can be constructed with any shape, size, number of pieces, and material.

Figure 1:
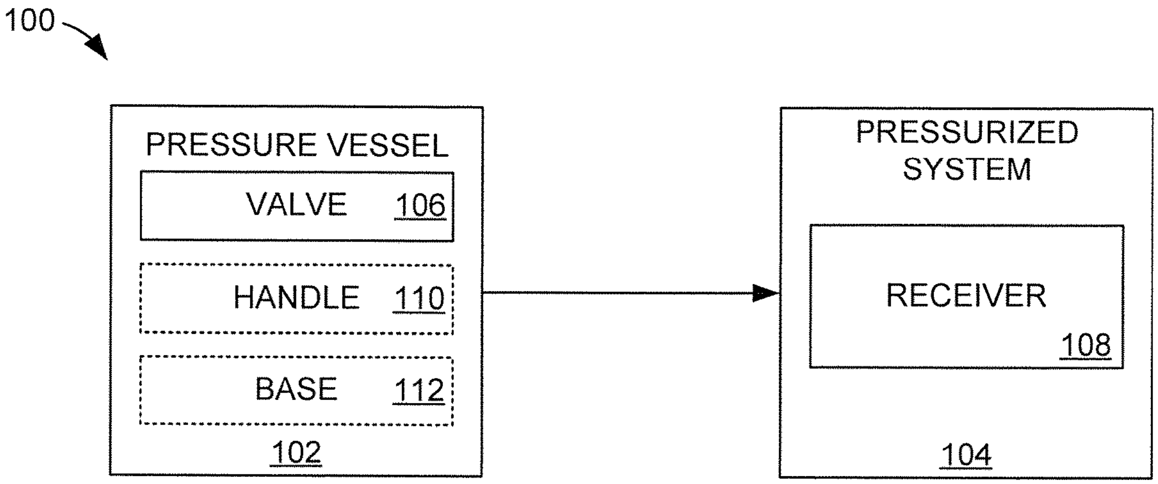
FIG. 1 generally provides a block representation of an example environment in which various embodiments may be practiced.

FIG. 1 conveys a block representation of an example environment 100 in which assorted embodiments of the present disclosure can be practiced. The environment 100 has one or more pressure vessels 102 that are utilized by a pressurized system 104 to harness the potential energy stored in the pressure vessel 102. That is, the pressure vessel 102 can contain nearly any liquid or gas at any pressure that has a potential energy when pressure is released and/or when the contained fluid is ignited.

Regardless of what fluid is contained within the pressure vessel 102, a valve 106 of the pressure vessel 102 connects to a receiver 108 of the pressurized system 104 to allow selective engagement of the contained fluid with the pressurized system 104. Hence, the valve 106 can have a manual and/or manual knob, solenoid, switch, or button that allows the fluid within the pressure vessel 102 to escape into the receiver 108 of the pressurized system 104. The pressure vessel 102 may additionally have one or more integrated handles 110 and a base 112 that simplify vessel storage and movement, but such vessel 102 aspects are optional, as illustrated by the segmented boxes in FIG. 1.

It is contemplated that the pressure vessel 102 can be cyclically filled by a compressor and/or pump followed by fluid release into the receiver 108. However, conventional vessel fill stations are cumbersome, bulky, and resident in a location distal and separated from the pressurized system 104. Hence, transportation of a pressurized pressure vessel 102 from a fill station to the pressurized system 104 is often necessary. Such transport can be difficult due to pressure vessel 102 weight and size and can be dangerous due to the relatively high pressure and volatility of the fluid being contained in the pressure vessel 102.

Figure 2A:
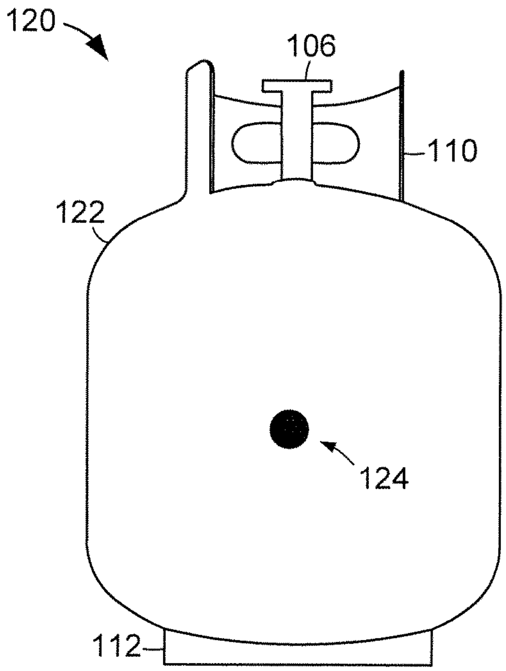
FIGS. 2A & 2B respectively display line representations of example pressure vessels that may be utilized in accordance with some embodiments.
Figure 2B:
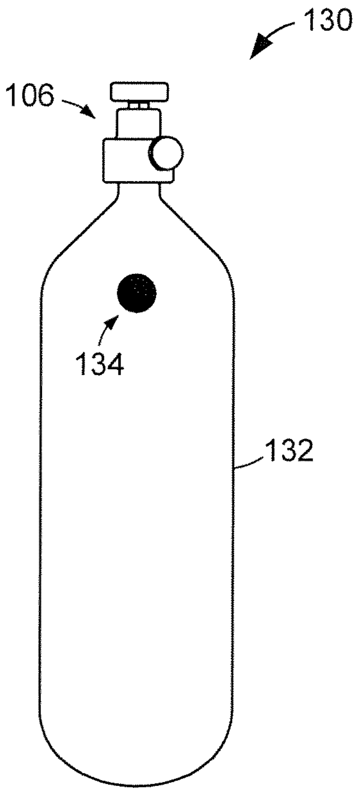

Accordingly, assorted embodiments are directed to incorporating the pressure vessel 102 into a transport system that allows the vessel 102 to be moved more easily and safely. FIGS. 2A and 2B respectively illustrate line representations of example pressure vessels 120 and 130 that can respectively be employed in the environment 100 as part of a transport system. FIG. 2A displays a first vessel 120 that has an interior sealed volume that is accessed by a valve 106. The first vessel 120 also has an integrated handle 110 and base 112 that are permanent aspects of the vessel housing 122. That is, the handle 110 and base 112 are each integrated, or affixed, to the housing 122 in a manner that prevents user relocation of the handle 110 and/or base 112.

Positioning the vessel's handle 110 and base 112 outside of the housing 122 can correspond to a substantially central center of gravity 124 due to the weight and size of the handle 110 and base 112 relative to the vessel housing 122. The second pressure vessel 130 of FIG. 2B depicts how a vessel can be configured without a handle 110 or base 112. Although it is contemplated that the second vessel housing 132 can be shaped to consist of a planar surface, the housing 132 of the non-limiting example second vessel 130 has only curvilinear exterior surfaces that are not conducive to temporary or permanent storage.

The lack of a handle 110 in the second vessel 130 creates a dangerous situation where a user will grasp the vessel valve 106 during transport. Such activity can stress the joint between the valve 106 and housing 132 and/or inadvertently open the valve 106 and create a hazardous situation. Without any extra exterior housing material to form a handle 110 and/or base 112, the second vessel 130 has a center of gravity 134 that is offset from the housing center towards the valve 106, which can make the vessel unbalanced and awkward to transport, store, and mount.

Figure 3:
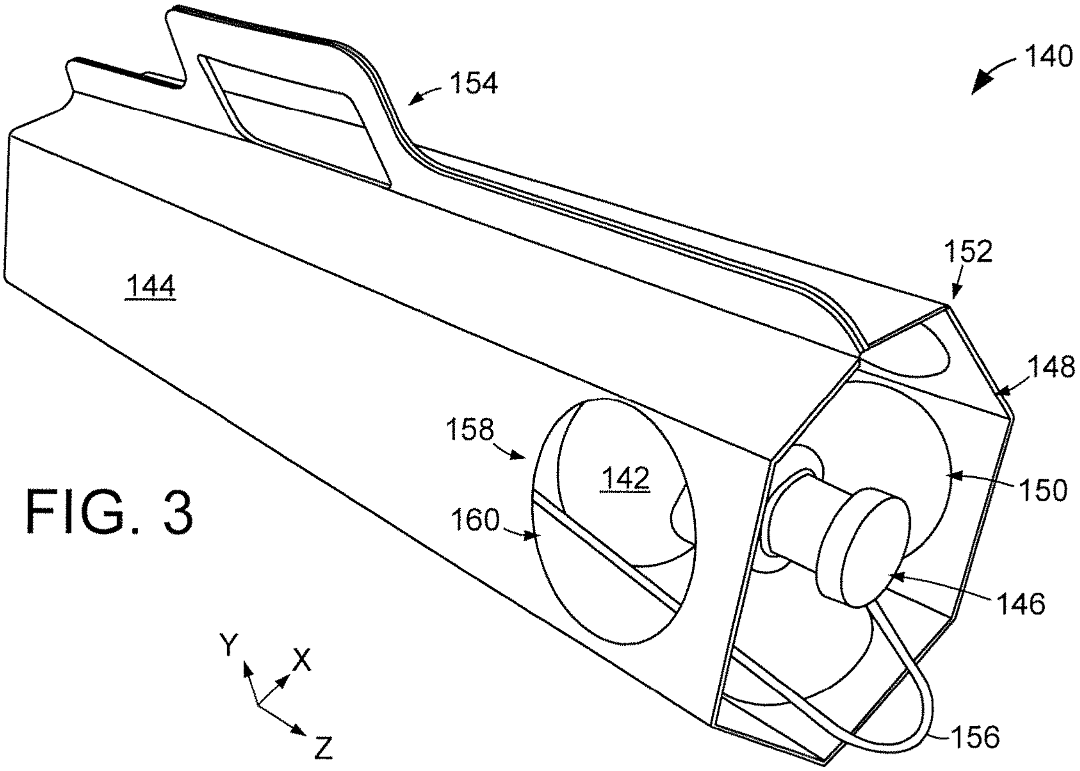
FIG. 3 shows a line representation of an example pressure vessel transport system that can be employed in the environment of FIG. 1.

Accordingly, various embodiments integrate the first 120 or second 130 pressure vessels into a vessel transport system where an external transport housing surrounds the vessel to protect the valve 106 while providing a handle to ease moving the vessel. FIG. 3 displays a line representation of an example pressure vessel transport system 140 that is constructed and operated in accordance with some embodiments. The transport system 140 has a pressure vessel 142 disposed within a transport housing 144 that surrounds the vessel 142.

The transport housing 144 is configured to be a single piece of material that folds along predictable grooves to surround the pressure vessel 142. The transport housing 144 further continuously extends along the longitudinal axis of the vessel, parallel to the Z axis, to position the vessel valve 146 within the areal extent of the transport housing 144. That is, the transport housing 144 wraps around the pressure vessel 142 and defines an interior areal extent 148 that corresponds with the internal dimensions of the housing 144. By positioning the valve 146 within the areal extent 148 of the housing 144, the valve 146 is protected from external trauma and inadvertent activation.

As shown, the transport housing 144 can have one or more valve apertures 150 that allow access to the vessel valve 146. The valve apertures 150 allow the pressure vessel 142 to remain in the transport housing 142 while being connected to a receiver, such as receiver 108 of FIG. 1. The transport housing 144 is configured with planar ends 152 that allow the system 140 to be stored upright on any flat surface. For instance, the system 140 allows a pressure vessel 142 with no base to be reliably stored in an upright (Z axis) orientation due to the planar end 152 contacting another flat surface.

Although not required or limiting, the external handle 154 defined by the transport housing 144 can be complemented by a hoist handle 156 that is proximal the vessel valve 146. It can be appreciated that the housing handle 154 allows for efficient transport of the pressure vessel 142 in a horizontal orientation while the hoist handle 156 allows for efficient transport of the pressure vessel 142 in a vertical orientation. The hoist handle 156 can be a part of a hoist assembly 158 that positions a centering member 160 in contact with the housing 144 and vessel 142 to secure the hoist handle 156.

The combination of differently oriented handles 154/156 allows for convenient and balanced movement of the transport system 140 without concern for the integrity of the valve 146 or the location of the vessel's center of gravity. It is contemplated that the transport housing 144 can be loosely wrapped around the pressure vessel 142, as shown, or is secured with one or more fastening means. In other words, engagement of the exterior handle 154 by a user may sufficient to retain the transport housing 144 in contact with, and surrounding, the pressure vessel 142 or a fastening means, such as a screw, rivet, or magnet, can secure the transport housing 144 in the configuration shown in FIG. 3.

Figure 4:
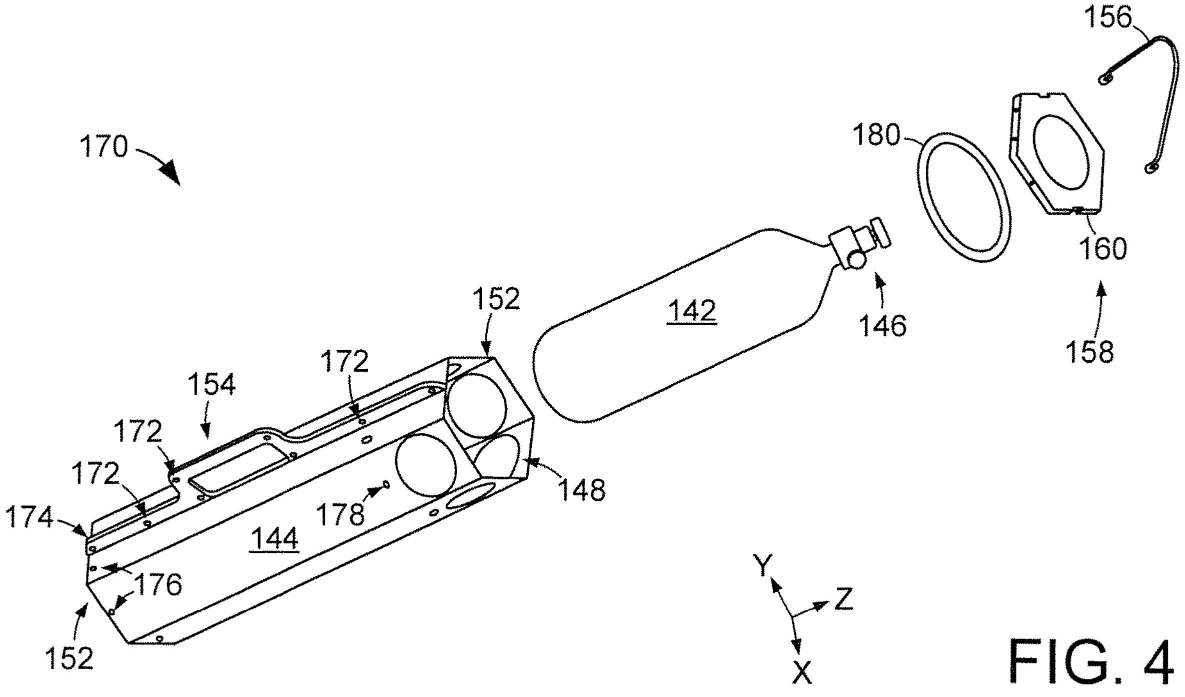
FIG. 4 is an exploded view line representation of an example pressure vessel transport system configured in accordance with various embodiments.

FIG. 4 is an exploded view line representation of an example pressure vessel transport system 170 arranged in accordance with various embodiments. It is noted that common reference numbers will denote similar aspects of different drawings, but does not require the aspects to be identical.

As shown, the pressure vessel 142 is loosely integrated into the transport housing 144 without any direct mounting hardware. That is, the pressure vessel 142 is not secured directly to the transport housing 144 and instead is loose to move and vibrate within the areal extent 148 defined by the transport housing 144. Although the hoist assembly 158 centers the pressure vessel 142 via contact of the centering member 160 with the vessel housing, the pressure vessel 142 remains free to move and vibrate. By configuring the transport system 140/170 to maintain the pressure vessel 142 in a loose arrangement, any pressure, trauma, and force is absorbed by the entirety of the pressure vessel housing 142 instead of a particular mounting point, or points. Thus, the loose vessel arrangement allows the strength of the entire vessel housing to be used to combat external contact.

The loose pressure vessel 142 arrangement in the transport housing 144 is complemented by the shape and size of the transport housing 144 that provides the planar ends 152 at locations outside the extent of the pressure vessel 142 or valve 146. In some embodiments, the planar end 152 distal the valve 146 is covered with a base plate that protects the bottom of the pressure vessel 142 and provides a rigid surface to support the transport system 170 in an upright orientation. Meanwhile, the opposite planar end 152 remains open to allow the hoist handle 156 and valve be individually accessed selectively.

As previously noted, the transport housing 144 can be secured in the cylindrical configuration shown in FIGS. 3 & 4 by one or more fastening means. The non-limiting embodiment of FIG. 4 conveys how multiple securing apertures 172 can be positioned along connection flanges 174 that define the exterior handle 154. The securing apertures 172 can be resident on each flange 174 positioned on opposite sides of the transport housing 144 and a fastener, such as a bolt, screw, magnet, or other protrusion, can extend through aligned apertures 172 to maintain at least a portion of the transport housing 144 in a cylindrical shape that defines the areal extent 148, which can also be characterized as an interior volume between the planar ends 152.

Other fastening apertures may also be positioned on various regions of the transport housing 144. For instance, one or more baseplate apertures 176 can be positioned proximal a planar end 152 to allow fasteners to extend into and secure a baseplate in position covering the planar end 152 distal the vessel valve 146. Hoist apertures 178 may be positioned proximal the valve 146 to allow fasteners to extend into and secure at least the centering member 160 in contacting position with the pressure vessel housing. It is contemplated that hoist apertures may be utilized to secure the hoist handle 156 to the transport housing 144. However, such hoist handle 156 securement does not necessitate a stationary hoist handle 156 as the fastening means via the hoist apertures 178 may allow for rotation of the hoist handle 156 relative to the centering member 160 and transport housing 144.

The hoist assembly 158 can consist of one or more dampening members 180 that are disposed between the centering member 160 and the pressure vessel 142. The dampening member(s) 180 can be any material, such as polymers, rubbers, elastomers, and cork, that are conducive to vibration and/or movement absorption. The dampening member(s) 180 may further soften any movement of the pressure vessel 142 against the centering member 160. The ability to tune the materials and size of the dampening member(s) 180 of the hoist assembly 158 allows the movement characteristics of the pressure vessel 142 to be customized, which can increase safety and transport efficiency.

Figure 5:
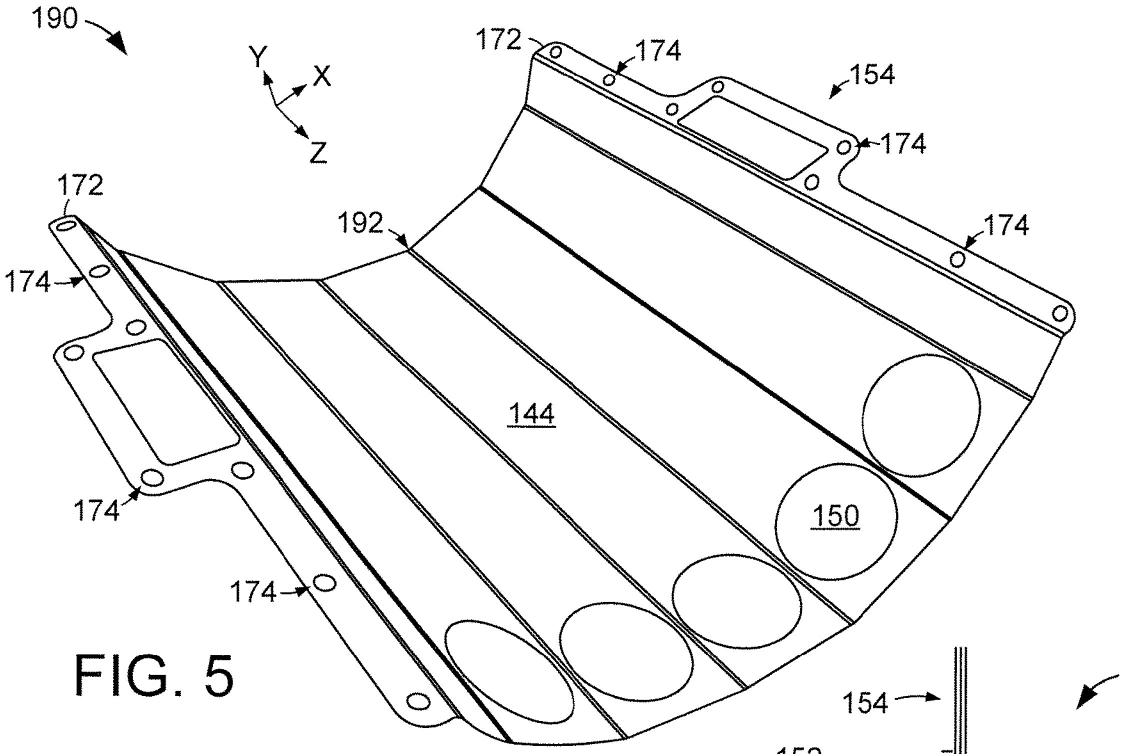
FIG. 5 depicts a line representation of a portion of an example pressure vessel transport system arranged in accordance with some embodiments.

FIG. 5 displays a line representation of an example transport housing 190 that can be employed in the transport systems 140/170 of FIGS. 3 & 4 in accordance with various embodiments. The partially articulated orientation of the transport housing 190 conveys how grooves 192, which are areas of reduced material thickness, allow for predictable movement into the cylindrical shapes illustrated in FIGS. 3 & 4. It is noted that the transport housing 190 can be a single piece of material or a lamination of multiple different materials that collectively form a sheet that can lay flat in a single plane or be articulated, as shown in FIG. 5 into a cylinder around a pressure vessel.

It is contemplated that the transport housing 190 consists of a plurality of separate rigid slats that are attached in a manner to allow articulation of the slats around a cylindrical pressure vessel. However, such rigid slats can exacerbate the transfer of force to the pressure vessel compared to the semi-rigid transport housing 190 that can bend, flex, and absorb external force. Hence, some embodiments configure the transport hosing 190 of a flexible material, such as a rubberized coating, rubber, foam, or combination thereof, that will retain a pre-defined shape as well as absorb reasonable amounts of force.

Figure 6:
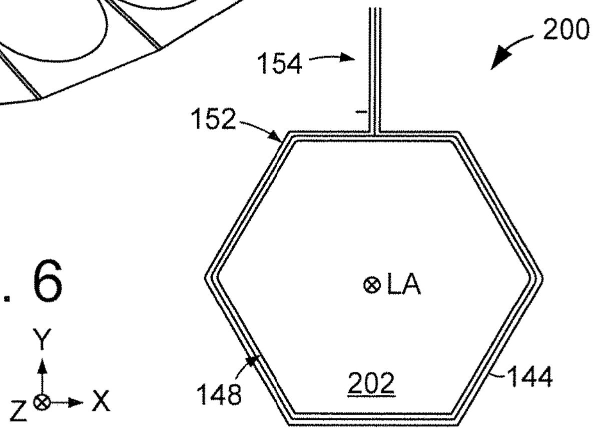
FIG. 6 conveys a side view line representation of a portion of an example pressure vessel transport system.

FIG. 6 shows an end view line representation of portions of an example pressure vessel transport system 200 arranged in accordance with various embodiments. The transport housing 144 has been articulated from the flat configuration conveyed in FIG. 5 to a cylindrical shape that can accommodate a pressure vessel within the areal extent 148 of the housing 144. The shape of the transport housing 144 can be reliably repeated thanks to the predefined grooves 192 that allow for efficient manipulation of the transport housing 144 about a pressure vessel. Thus, it is contemplated that the transport housing 144 is manipulated into the configuration shown in FIG. 6 while a pressure vessel is in contact with the transport housing 144.

The end view of FIG. 6 illustrates how a baseplate 202 can be inserted into the housing's areal extent 148 to cover one planar end 152 of the housing 144 while leaving the other planar end open. It is contemplated that the transport housing 144 can accommodate multiple baseplates 202 that separately cover the opposite planar ends 152 of the housing. The construction of a baseplate 202 is not limited and can partially, or completely, occupy a planar end 152 with one or more materials, such as in a lamination or separated layers.

A baseplate 202 may be positioned inside the transport housing 144 at the planar end 152 to allow one or more fasteners to continuously extend through the housing 144 into the baseplate 202. A baseplate 202 can be positioned outside the housing's areal extent 148, such as on the planar end 152, to partially, or completely cover the planar end 152. For instance, a baseplate 202 may be attached to the transport housing 144 with fasteners extending parallel to the Z axis and have an ornamental and/or practical design that consists of holes and/or open regions. The ability to utilize one or more baseplates 202 is a variety of different configurations can provide a rigid, or semi-rigid, structure that protects a pressure vessel contained in the housing's areal extent 148 while providing additional surface area for the transport system 200 to balance upon when stored in an upright position where the longitudinal axis (LA) of the pressure vessel is parallel to the Z axis.

Figure 7:
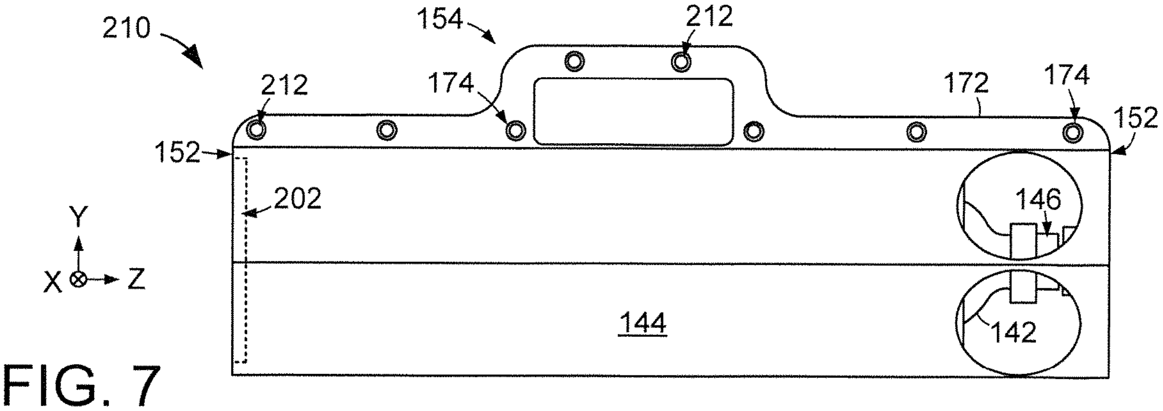
FIG. 7 illustrates a line representation of a portion of an example pressure vessel transport system constructed and operated in accordance with assorted embodiments.

The side view line representation of an example pressure vessel transport system 210 depicted in FIG. 7 conveys how a pressure vessel 142 is wholly contained within the areal extent defined by the transport housing 144. It is noted that the transport housing 144 can be characterized, in some embodiments, as assembled when the connection flanges 174 of opposite sides of the transport housing 144 contact to form a substantially cylindrical shape with fasteners 212 extending through the apertures of each flange 174. Such assembly may correspond with the external handle 154 being formed and/or fasteners extending through the connection flanges 174. The combination of the baseplate 202 on one planar end 152 and the centering member 160 proximal the opposite planar end 152 with the transport housing 144 continuously extending around the periphery of the pressure vessel 142 can reliably and safely secure the pressure vessel 142 for transport.

Figure 8:
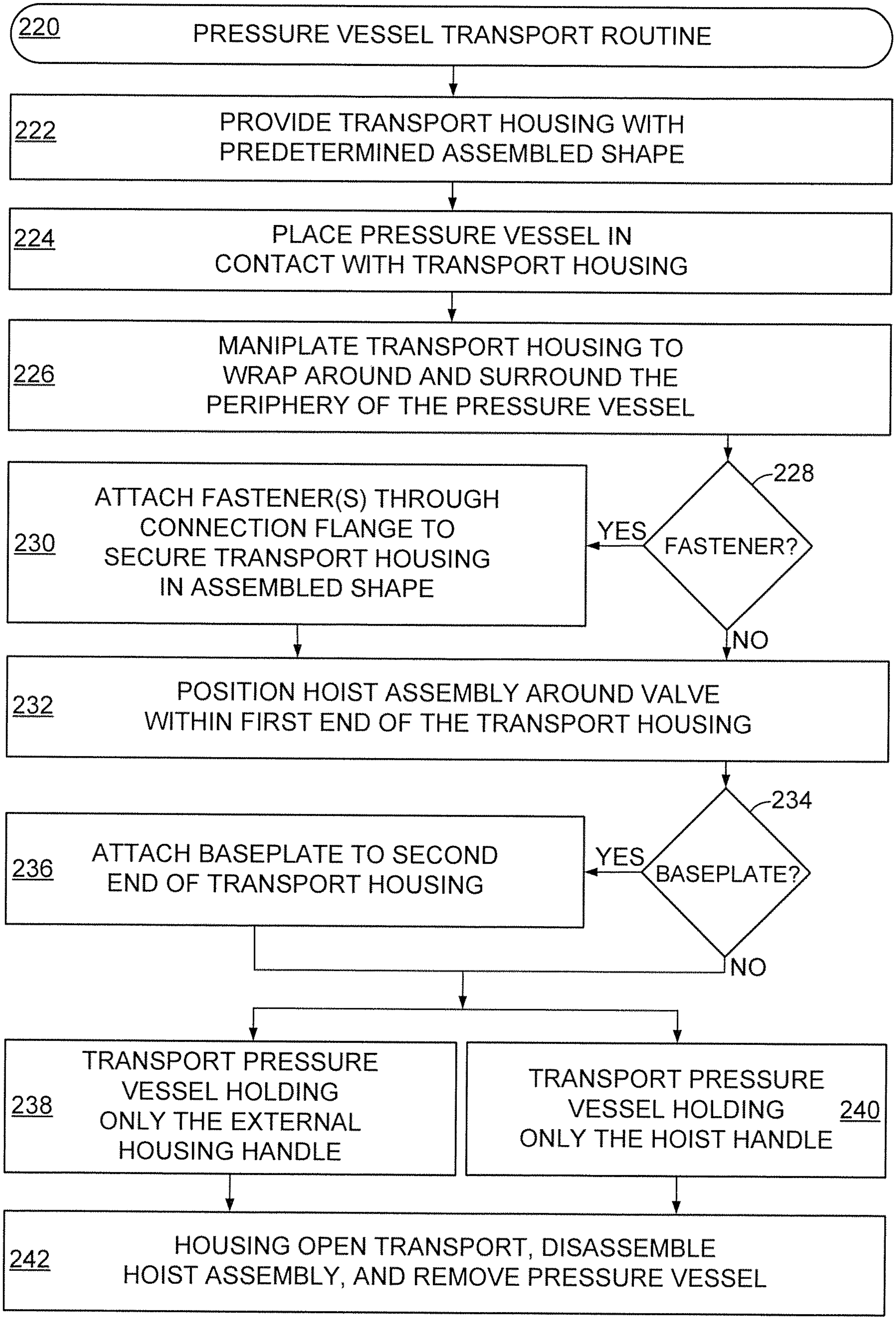
FIG. 8 provides an example pressure vessel transport routine carried out in accordance with various embodiments.

FIG. 8 is a flowchart of an example pressure vessel transport routine 220 that can be conducted with the various embodiments of FIGS. 2A-7 in the environment 100 of FIG. 1 in accordance with assorted embodiments. The transport routine 220 begins with step 222 providing a transport housing with a predetermined assembled shape. The transport housing can be a single piece of material, as shown in FIG. 5, with connection flanges and at least one external handle that come together according to predefined grooves to form the assembled shape.

While the transport housing is open and unassembled, step 224 proceeds to place a pressure vessel in contact with the transport housing, such as in substantially the center of the transport housing. The transport housing is then manipulated in step 226 to surround the pressure vessel. It is noted that the transport housing is arranged in step 226 to contact the periphery of the pressure vessel along an axis parallel to the longitudinal axis of the vessel. In other words, the transport housing is wrapped around the pressure vessel in order to bring the connection flanges and external handle together and define an internal areal extent between two planar ends.

The assembled configuration of the transport assembly can be secured in-place via one or more fasteners extending through the connection flanges and/or external handle. Decision 228 evaluates if fasteners are to be incorporated into the transport housing. If so, step 230 attaches the fastener(s) through predefined apertures in the transport housing. At the conclusion of step 230, or if no fasteners are to be used, step 232 positions a hoist assembly in contact with the pressure vessel within the transport housing. The hoist assembly can consist of at least a centering member that continuously surrounds the pressure vessel to center the vessel within the areal extent of the transport housing and a hoist handle.

The position of the hoist assembly is not required, but in some embodiments, is proximal vent apertures in the transport housing and the valve portion of the pressure vessel. Decision 234 determines if a baseplate is to be incorporated into the transport assembly. Step 236 attaches a baseplate to a planar end of the transport housing, opposite the vessel valve, with at least one fastener in step 236 if prompted by decision 234.

In the event no baseplate is chosen, or after the baseplate is attached, the routine 220 can advance to either step 238 where the pressure vessel is transported by holding only the external housing handle or step 240 where the hoist handle is only engaged to transport the pressure vessel. It is noted that engagement of the external handle will transport the housing and pressure vessel in a horizontal orientation just as holding the hoist handle will transport the housing and pressure vessel in a vertical orientation.

Regardless of how the transport housing and pressure vessel is oriented during transport, step 242 opens the transport housing, disassembles the hoist assembly, and removes the pressure vessel so that it can be utilized as part of a pressurized system. It is contemplated that the pressure vessel can be connected to the pressurized system via a receiver prior to the valve of the pressure vessel being opened either manually or remotely. The connection of the pressure vessel in the pressurized system results in the transport housing, hoist assembly, and baseplate free to be utilized to transport a different pressure vessel. That is, the transport system can be employed repeatedly with different pressure vessels of different sizes, shapes, pressures, and destinations.

Through the various embodiments of a pressure vessel transport system, a pressure vessel can be more safely moved between locations due to the valve and vessel housing being protected. The planar end configuration of the transport housing allows for reliable upright pressure vessel storage even though the vessel may only have curvilinear sidewalls and no planar base. The combination of multiple different system handles allows the pressure vessel to be efficiently moved by hand or by rope without exposing any part of the pressure vessel outside of the transport housing.

What is claimed is:

1. An apparatus comprising a housing surrounding a pressure vessel, the pressure vessel having a valve, the housing continuously extending along a longitudinal axis of the pressure vessel to position an entirety of the pressure vessel and the valve within the housing, the pressure vessel being loose within the housing, the pressure vessel contacting a hoist assembly within an areal extent of the housing, the hoist assembly comprising a centering member and a hoist handle, the centering member contacting and centering the pressure vessel within the housing, the hoist handle extending from within the housing to a position outside the housing.

2. The apparatus of claim 1, wherein the housing is a single piece of material.

3. The apparatus of claim 2, wherein the housing has at least one bend region, each bend region defined by a reduced thickness of the single piece of material.

4. The apparatus of claim 1, wherein the housing has at least one aperture aligned with the valve.

5. The apparatus of claim 2, wherein the housing comprises first and second flanges positioned on opposite regions of the single piece of material, the flanges configured to mate and form a handle, the single piece of material surrounding the pressure vessel.

6. The apparatus of claim 1, wherein the housing is maintained in the surrounding configuration about the pressure vessel by at least one fastener.

7. The apparatus of claim 1, wherein a handle is connected to the housing via at least one fastener.

8. The apparatus of claim 7, wherein the hoist handle comprises a wire constructed of a different material than the housing.

9. The apparatus of claim 1, wherein a base is affixed to the housing distal the valve via at least one fastener.

10. The apparatus of claim 1, wherein the housing is closed on a first end, distal the valve, and open on a second end, proximal the valve.

11. A system comprising:

a housing;

a pressure vessel having a valve, the pressure vessel positioned in the housing with the housing continuously extending along a longitudinal axis of the pressure vessel to dispose an entirety of the pressure vessel and the valve within an areal extent of the housing, the pressure vessel being loose within the housing; and a hoist assembly contacting the pressure vessel within an areal extent of the housing, the hoist assembly comprising a centering member and a first handle extending around the valve, the centering member contacting and centering the pressure vessel within the housing, the hoist handle configured to rotate relative to the centering member and housing.

12. The system of claim 11, wherein the first handle continuously extends from within the areal extent of the housing to a position outside of the areal extent of the housing.

13. The system of claim 11, wherein the housing comprises a second handle aligned parallel with the longitudinal axis of the pressure vessel.

14. The system of claim 13, wherein the second handle is positioned external to the areal extent of the housing.

15. The system of claim 11, wherein the hoist assembly comprises a gasket disposed between the pressure vessel and the centering member.

16. The system of claim 15, wherein the centering member extends between mounting portions of the first handle.

17. The system of claim 15, wherein the centering member restricts movement of the first handle.

18. A method comprising:

positioning a pressure vessel in loose contact with a housing, the pressure vessel comprising a valve;

articulating the housing to surround the pressure vessel and position an entirety of the pressure vessel and valve within the housing;

inserting a hoist assembly comprising a centering member around a valve of the pressure vessel to center the pressure vessel within the housing, the centering member attached to a hoist handle that extends from within an areal extent of the housing to a position outside the housing;

moving the housing and pressure vessel in a vertical orientation via the hoist handle; and transporting the housing and pressure vessel in a horizontal orientation via a housing handle positioned on the housing.

19. The method of claim 18, wherein the housing is fastened together to provide the housing handle.

20. The method of claim 18, wherein the pressure vessel contacts a base and the centering member each positioned within the housing.

* * * * *